H. H. KLASSEN.
INTERNAL COMBUSTION ENGINE.
APPLICATION FILED MAY 20, 1916.

1,259,884.

Patented Mar. 19, 1918.
2 SHEETS—SHEET 1.

Inventor:
Harry H. Klassen

H. H. KLASSEN.
INTERNAL COMBUSTION ENGINE.
APPLICATION FILED MAY 20, 1916.
1,259,884.
Patented Mar. 19, 1918.
2 SHEETS—SHEET 2.
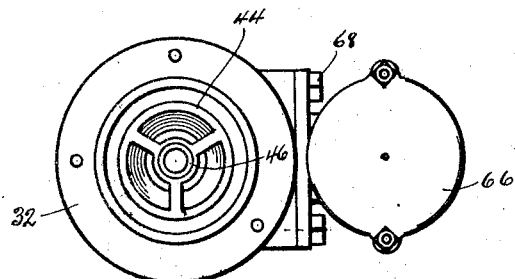
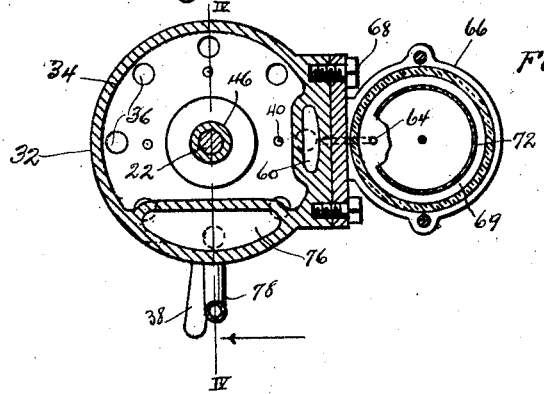
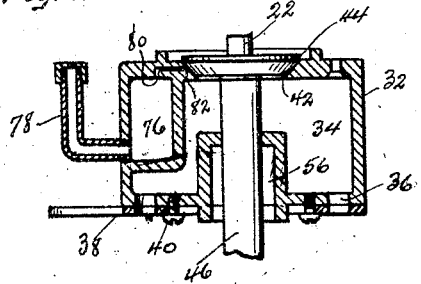
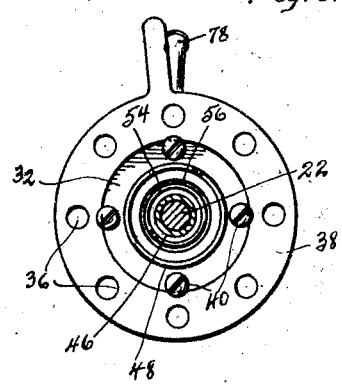
Inventor
Harry H. Klassen,
Witness
R. E. Hamilton
By Chas. W. Gerard
his Attorney

UNITED STATES PATENT OFFICE.

HARRY H. KLASSEN, OF WYANDOTTE COUNTY, KANSAS, ASSIGNOR OF FORTY-FIVE ONE-HUNDREDTHS TO GEORGE W. FENBECK, OF KANSAS CITY, MISSOURI.

INTERNAL-COMBUSTION ENGINE.

1,259,884.   Specification of Letters Patent.   Patented Mar. 19, 1918.

Application filed May 20, 1916. Serial No. 98,789.

*To all whom it may concern:*

Be it known that I, HARRY H. KLASSEN, a citizen of the United States, and a resident of Wyandotte county, in the State of Kansas, have invented certain new and useful Improvements in Internal-Combustion Engines, of which the following is a full and exact specification.

The present invention relates to internal combustion engines, and particularly to the fuel feeding mechanism thereof, and aims to provide means for proper carburation as well as for properly feeding the liquid fuel in definite quantities at intervals regulated in accordance with the movements of the intake valve and in predetermined time relation with the suction stroke of the engine.

A further object is to provide a feeding arrangement designed to be associated with the individual cylinders of a multiple cylinder engine and adapted to render each cylinder entirely self-contained and independent of the action of the remaining cylinders as regards its fuel supply.

It is also sought to devise a construction entirely automatic in operation and so connected and arranged as to permit of no leakage or overflow of the fuel feeding passages.

For carrying out these objects the invention provides the fuel feeding inlet with a valve which is operated mechanically and at proper predetermined intervals with relation to the periods of operation of the cylinder intake valve.

With these general objects in view, as well as minor objects as will hereinafter appear, the invention will now be described with reference to one form of embodiment of the same as illustrated in the accompanying drawings, after which those various features and combinations deemed to be novel will be severally set forth and defined in the appended claims.

In the drawings—

Fig. 2 is a bottom plan view of the fuel feeding attachment;

Fig. 3 is a horizontal section on the line III—III of Fig. 1;

Fig. 4 is a vertical section on the line IV—IV of Fig. 3 (but omitting the feed inlet valve spring); and Fig. 5 is a horizontal section taken on the line V—V of Fig. 1.

Figure 1:
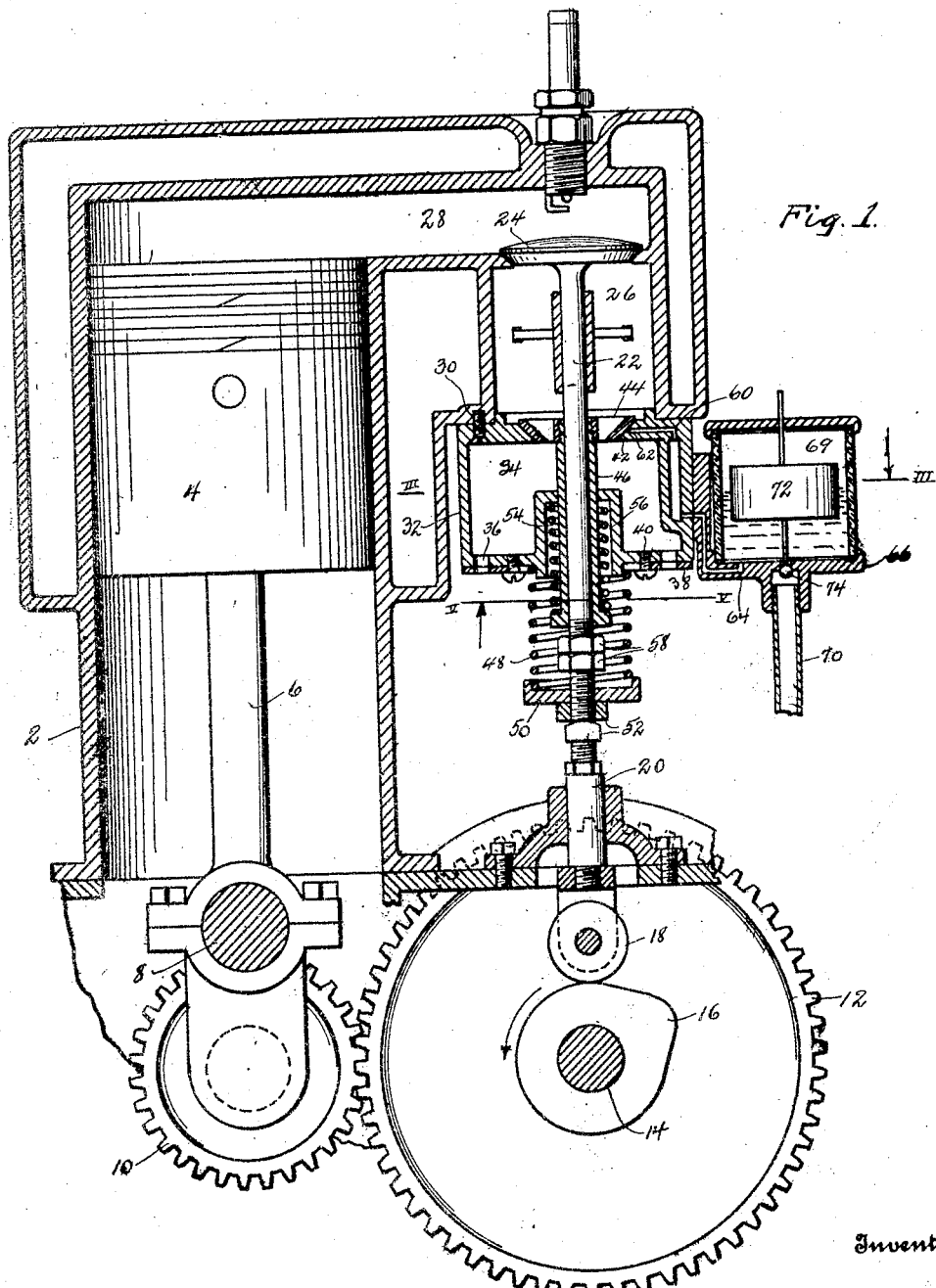
Figure 1 is a vertical sectional view of an internal combustion engine cylinder with the present improvements applied thereto.

Referring to the drawings in detail, these illustrate a common type of four cycle engine comprising the cylinder 2 with the piston head 4, piston rod 6 and crank shaft 8 connected by the gearing 10—12 to the cam shaft 14, the latter being provided with the usual cam 16 in engagement with the cam roll 18 for operating the push rod 20 connected to the stem 22 of the intake valve 24 which controls the passage from the mixing chamber 26 into the combustion chamber 28.

At the mouth of the mixing chamber 26, and secured to the engine casing in any suitable manner—as by the screws 30, is fitted a casing 32 providing an air chamber 34 having the air inlet openings 36 regulated by the correspondingly perforated annular plate 38 movably mounted upon the base of the casing 32 by means of the screws 40. The chamber 34 communicates with the mixing chamber 26 through the opening 42 the margin of which forms a valve seat for the skeleton valve 44 carried by the tubular valve stem 46 mounted slidingly upon the valve stem 22, said two stems 22 and 46 passing centrally through the casing 32. The valve 24 is held with the cam roll 18 in engagement with the cam 16 by the action of the spring 48 seated at one end against the bottom of the casing 32 and at its opposite end against the washer 50 provided with the set nuts 52. The valve 44 is held normally seated by means of a spring 54 coiled about the stem 46 in engagement with the lower flanged end of the latter, said spring extending within and abutting against the inner end of the cylindrical recess 56 provided in the bottom face of the casing 32. Upon the valve stem 22 intermediate the washer 50 and the lower end of the valve stem 46 are mounted the adjustable set and lock nuts 58 in proper predetermined relation for engaging and lifting the stem 46 and thereby opening the valve 44 at the required intervals as hereinafter explained.

Formed within the wall of the chamber 32 is a fuel conduit 60 having its mouth or fuel inlet opening 62 at the valve seat 42, so that the valve 44 operates to control the passage through said inlet opening. The conduit 60 communicates with a similar fuel conduit 64 formed in the walls of the float chamber attachment 66 which is adapted to be detachably connected to the casing 32 by means of the screws 68. The conduit 64 leads into a float chamber 69 provided in said attachment and having a tube connection 70 leading to any suitable source of fuel supply (not shown), the level of the liquid in said chamber being automatically controlled by the float 72 connected with the valve 74, and it being only essential that said level be maintained at any point below the level of the fuel inlet opening 62.

Within the casing 32 is also formed an auxiliary fuel supply chamber 76 (see Figs. 3 and 4) provided with the filling tube 78 and with the feed conduit 80 leading to the auxiliary feed inlet port 82 at the valve seat 42. By means of this construction a lighter fuel than that ordinarily fed from the chamber 69 may be used, if needed, for starting the engine.

In Fig. 1 of the drawings, the piston 4 is illustrated as about to begin its suction stroke, and the cam 16, turning in the direction of the arrow, is about to open the intake valve 24 by lifting the roll 18. Air will at once begin to be sucked into the mixing chamber 26 by way of the openings 36 and the skeleton inlet valve 44. As soon as the valve stem 22 has been lifted the required predetermined distance for engaging the nuts 58 with the valve stem 46, the valve 44 will then be opened, with the result that there is an increase in the rush of air into the mixing chamber and at the same time the fuel inlet openings 62 and 82 are opened to the influence of the engine suction. Said valve 44 remains open for only a part of the interval of the opening of the intake valve 24, or until the lowering of the valve stem 22 results in the disengagement of the nuts 58 from the valve stem 46; but during the time that said valve 44 is open a continuous feed of fuel takes place from the chamber 69 through the conduits 64 and 60 and out through the fuel inlet port 62 into the mixing chamber 26. It will be noted that there is no flow of fuel from the chamber 69 dependent upon gravity, the level of the fuel in said chamber being kept at all times below the inlet opening 62 and the latter closed except during the fuel feeding operation, and this feeding operation serving to deliver a steady and positive flow of the fuel continuously throughout the interval as determined by the adjustment of the nuts 58, which interval will always be a given fraction of the interval during which the intake valve 24 remains open.

It will thus be apparent that an extremely simple and effective arrangement has been devised for carrying out the objects of the invention. All hand operation or adjustments of the fuel feeding mechanism are dispensed with after the engine has once been assembled and the parts set in initially correct position for operating in proper time relation. The engine takes care of itself under all conditions of loads, speeds, etc., the fuel feeding mechanism being self-regulating under all such conditions. Moreover, each cylinder of the engine is completely self-contained, having no dependence whatever upon the remaining cylinders as regards the fuel feeding operation, since each cylinder will be separately equipped with the attachments and connections above outlined. Any one cylinder might, therefore, get out of order, but the remaining cylinders would remain operative. It is apparent also that the construction and arrangement are such that there can be no overflow or leakage of the fuel, since the inlet opening is above the fuel supply level in the chamber 69; and as the inlet opening 62 is closed at all times excepting for a given feeding interval, the fuel is always fed in the right proportion, and the danger of any surplus fuel being drawn into the engine or of flooding the same is practically obviated.

While the foregoing represents what is now deemed to constitute the preferred form of embodiment of the invention, the right is reserved to all such formal changes and modifications as may fairly fall within the scope of the appended claims.

Claims:

1. In an internal combustion engine, the combination, with the intake valve, of a mixing chamber associated with said valve and provided with a fuel inlet port, and a single valve member operating to control the flow of fuel through said port and also to regulate the admission of air to said chamber.

2. In an internal combustion engine, the combination, with the intake valve, of means for operating said valve, a mixing chamber associated with said valve and provided with a fuel inlet port, and a single valve member actuated by the operation of said intake valve both to control the flow of fuel through said port and to regulate the admission of air to said chamber.

3. In an internal combustion engine, the combination, with the intake valve, of a mixing chamber associated with said valve, and automatic valve means operating to control the admission of fuel to said chamber, said valve means admitting a limited amount of air to said chamber while the fuel is cut off and acting to admit an increased amount of air simultaneously with the admission of the fuel.

4. In an internal combustion engine, the combination, with the intake valve, of means for opening and closing said valve, a mixing chamber associated with said valve, and automatic valve means operating to control the admission of air and fuel to said chamber, said valve means operating to admit a limited amount of air to said chamber while said intake valve is closed and the fuel cut off and to admit an increased amount of air simultaneously with the admission of fuel during the opening of said intake valve.

5. In an internal combustion engine, the combination, with the intake valve, of means for opening and closing said valve, a mixing chamber associated with said valve, and automatic valve means arranged to admit a limited amount of air to said chamber while said intake valve is closed, said valve means being actuated by the opening of said intake valve to admit fuel to the chamber and simultaneously admit an increased supply of air to said chamber.

6. In an internal combustion engine, the combination with the intake valve, of a mixing chamber provided with a fuel inlet port, a valve mounted slidingly upon the stem of said intake valve for controlling said fuel inlet, means for operating said intake valve in time relation with the suction stroke of the engine, and means associated with said intake valve stem for engaging and positively actuating said inlet valve to open the same during a portion of the interval of opening of said intake valve.

7. In an internal combustion engine, the combination with the intake valve, of a mixing chamber provided with a fuel inlet port and an air inlet opening, means for opening and closing said valve and automatic valve means actuated by the operation of said first means for controlling the passage through said fuel inlet port and simultaneously regulating the flow of air through said air inlet opening.

8. In an internal combustion engine, the combination with the intake valve, of a mixing chamber provided with a fuel inlet port and an air inlet opening, a skeleton valve seated in said opening and acting as a closure for said fuel inlet port, means for opening said inlet valve, and means acting automatically to open said skeleton valve during a portion of the interval of opening of said intake valve.

9. In an internal combustion engine, the combination with the intake valve, of a mixing chamber provided with a fuel inlet port and an air inlet opening, a skeleton valve seated in said opening and acting as a closure for said fuel inlet port, said skeleton valve being mounted slidingly upon the stem of said intake valve, means for operating said intake valve in time relation with the suction stroke of the engine, and means associated with said intake valve stem for engaging and operating said skeleton valve during a portion of the interval of opening of said intake valve.

10. In an internal combustion engine, the combination, with the intake valve, of means for opening and closing said valve, a mixing chamber associated with said valve, valve means arranged to admit a limited amount of air to said chamber while said intake valve is closed, and an adjustable means actuated by the opening of said intake valve to operate said valve means for admitting fuel to said chamber and simultaneously admitting an increased amount of air thereto.

11. In an internal combustion engine, the combination, with the intake valve, of a mixing chamber, an attachment adapted to be detachably secured in communication with said mixing chamber, said attachment comprising a fuel chamber with a conduit leading therefrom and having a delivery port located above the level of the fuel in said fuel chamber and in position to admit fuel to said mixing chamber, and a single automatic valve member operating both to admit air to said mixing chamber and to regulate the flow of fuel through said port.

12. In an internal combustion engine, the combination, with the intake valve, of a mixing chamber associated with said valve, an attachment adapted to be detachably secured in communication with said chamber, said attachment being formed with an air opening communicating with said chamber and provided with a fuel conduit having a delivery port at said opening, a skeleton valve seated in said opening and acting as a closure for said port, and means operated automatically to open said skeleton valve during a portion of the interval of opening of said intake valve.

HARRY H. KLASSEN.